Nov. 24, 1931.  A. L. PAGET  1,833,754

VIBRATION DAMPING BY IMPACT

Filed Aug. 22, 1930

Inventor:
Alan L. Paget,
by Charles E. Tullar
His Attorney.

Patented Nov. 24, 1931

1,833,754

UNITED STATES PATENT OFFICE

ALAN L. PAGET, OF SCHENECTADY, NEW YORK, ASSIGNOR TO GENERAL ELECTRIC COMPANY, A CORPORATION OF NEW YORK

VIBRATION DAMPING BY IMPACT

Application filed August 22, 1930. Serial No. 477,142.

This invention relates to vibration damping means, and more particularly to a means for damping, by impact, the vibrations stimulated in rigidly supported members, especially such members when carried by a rotating body.

The invention is particularly adaptable to turbine buckets, aeroplane propellers and the like, and while I have shown and described my invention as applied to the bucket of a turbine, it will be understood that it is not necessarily limited thereto.

These buckets which are fixed at one end to their supports are caused to vibrate by an impressed force and these vibrations result in fatigue failure and subsequent breakage of the buckets.

The object of my invention, therefore, is to provide a means for damping the vibrations of such a bucket and for a consideration of what I believe to be novel and my invention, attention is directed to the accompanying description and the claims appended thereto.

Figure 1:
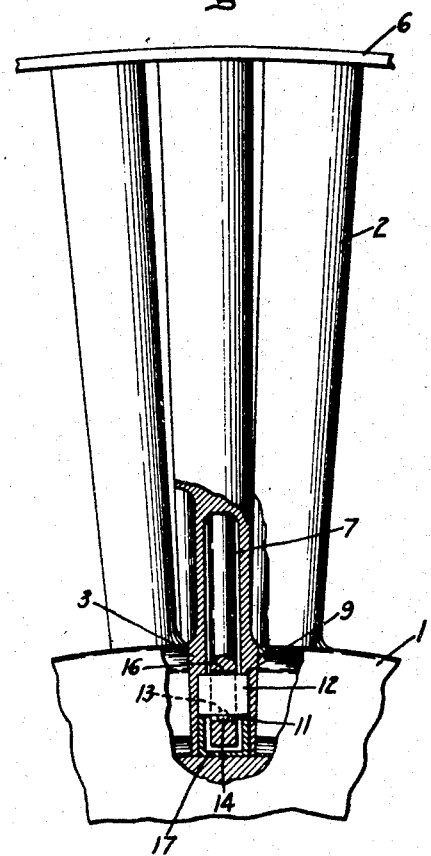
Figure 2:
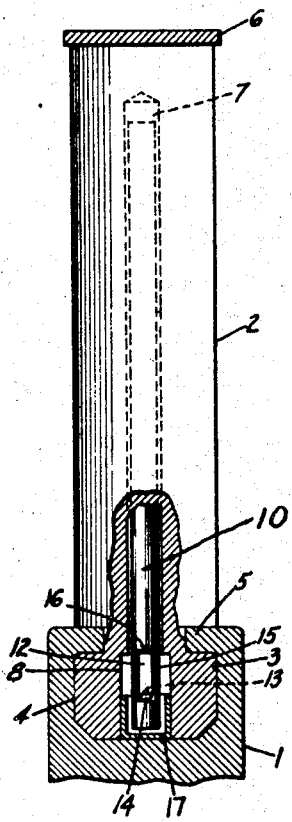

In the drawings, Fig. 1 is a side view of the wheel of a turbine carrying the buckets with parts broken away, and in section, to show the application of my damping means thereto; Fig. 2 is a side view with parts in section showing the application of the damping means.

Referring to the drawings, the wheel 1 is shown as carrying the buckets 2, which are rigidly mounted on the wheel in any usual manner. In the embodiment disclosed, I have shown the buckets as provided with heads 3 seated in recesses 4 in the wheel, the heads coacting with flanges 5 of the wheel to provide a rigid connection between the wheel and the buckets. The usual shroud band 6 connects the tops of the buckets.

Each bucket is formed with a cylindrical longitudinal hole 7, of uniform diameter, extending substantially the entire length thereof, while at the bottom of the bucket, this hole is enlarged as shown at 8 to provide shoulders 9 in the side walls of the bucket. A rod 10, which functions as an impactor, and which is of a length and diameter slightly less than the length and diameter of the hole 7, as shown in the drawings, is placed in the hole. In the drawings this rod is shown at the outer limit of its movement due to the centrifugal pull on it.

Impact takes places between this rod 10 and the walls of the bucket when the bucket vibrates, thereby dissipating the energy of the vibrating bucket and producing damping of the bucket. The rod must be secured within the bucket in a manner to leave it free to move laterally under the impact of the bucket, but in such a way that it cannot move longitudinally in the hole due to the centrifugal pull thereon caused by the rotation of the bucket. If the rod is rigidly supported in the bucket it will have a natural frequency of vibration of its own, and when impacted by the walls of the bucket beating will occur. This beating is undesirable since, when a beat occurs, both the bucket and the rod will move together and cut down the number of impacts, thereby lessening the damping action.

I have found that, if the rod be loosely mounted in the bucket, so as to have no natural frequency of vibration of its own, and also free to move laterally in all directions, there will be the greatest possible number of impacts, due to the absence of any possibility of beats between the bucket and the impactor. This will result in better damping, while the rod will still be held from moving longitudinally as a result of any centrifugal pull caused by the rotation of the bucket.

I accordingly support the rod in the bucket in the following manner. Through the lower end of the rod is formed a rectangular slot 11 and in this slot is placed a flat key 12 with its ends extending past the rod, into the enlarged end 8 of the recess 7 to engage the shoulders 9 as shown in Fig. 1. In the center of the lower edge of the key is formed a hemispherical recess 13 in which is placed a spherical ball 14, the ball resting between the lower edge of the key and that part of the wall of the rod 10 forming the lower edge of the slot 11. A clearance 15 is provided between the side faces of the key and the walls of the rod and there is also a slight clearance 16 between the top of the key and the adjacent wall of the slot. A hollow metal cap 17 encloses the lower end of the rod 10 and forms a seat for the protruding ends of the key 12, the height of the cap being such that its base is flush with the bottom of the hole 7.

In assembling, the ball is laid in the hole in the key and both are slipped into the rectangular slot, in the rod 10. The assembly is then placed in the bucket, after which the metal cap is placed in position to retain the assembly in place.

It is thus apparent that the rod 10 forms an impactor which has only a single point of suspension, with rolling friction only, and the natural frequency of vibration of the rod is zero. Thus when the bucket vibrates, no matter what may be the frequency of its vibration, there is no possibility of beats taking place between the bucket and the impactor, which will be thrown back and forth against the walls of the aperture and which will, by impact, dissipate all the vibratory energy imparted to the bucket by the actuating force.

In accordance with the provisions of the patent statutes I have described the principle of operation of my invention together with the structure which I now consider to represent the best embodiment thereof, but I desire to have it understood that the structure shown is only illustrative and that the invention may be carried out by other means.

What I claim as new and desire to secure by Letters Patent of the United States is:

1. In combination with an elongated body having a longitudinal hole therein, mounting means for said body and means for damping the vibrations of said body comprising a rod extending into said hole, said hole being enlarged at one end to provide shoulders in said body, a slot in one end of said rod, a flat key extending through said slot having its upper edge abutting said shoulders, a hemispherical seat formed in the lower edge of said key, a spherical member resting in said seat and interposed between said key and the lower wall of said slot and means enclosing the end of said rod for maintaining said key in engagement with said shoulders to provide a pivotal support for said rod.

2. In combination, a rotor which is subjected to vibrations, an elongated member extending therefrom, fixed at one end thereto, and provided with a longitudinal hole, means for damping vibrations of said elongated member comprising a longitudinal member, having a slotted end extending into said hole, and means connecting the slotted end of said longitudinal member to said elongated member, said means comprising a key extending through said slot into engagement with the walls of said elongated member and a member seated in said key and interposed between said key and a wall of said slot forming a pivot for said longitudinal member.

3. The combination with a bucket rigidly secured at one end to a rotating body, said bucket having a longitudinal hole therein, of means for damping the vibrations of said bucket, comprising an impactor movably mounted in said hole and adapted to cause impact on the walls forming said hole and to dampen vibrations of said bucket.

4. The combination with a bucket rigidly secured at one end to a rotating body and having an axial hole therein, of means for damping the vibrations of said bucket, said means comprising a member positioned in said hole and free to move laterally but not longitudinally therein.

5. The combination with a bucket rigidly secured at one end to the rotor of a turbine and provided with a hole extending longitudinally therein, of means for damping the vibrations of said bucket, said means comprising a rod loosely mounted at the fixed end of said bucket and substantially filling said hole, said rod being adapted to be moved laterally in all directions when impacted by the walls of said bucket.

6. In combination with a support, a machine part, means for securing said part to said support and means for damping vibrations of said part comprising a member movably arranged within a hole provided in said part, said damping means being adapted to alternately cause impact on the walls forming said hole whereby vibratory energy of said part is compensated.

7. In combination with a support, a machine part, means for securing said part to said support and means for damping vibrations of said part comprising a member arranged within a hole provided in said part and means for pivotally connecting said member to the walls forming said hole, whereby said member alternately causes impact on the walls forming said hole and thus dampens the vibrations of said part.

8. In combination with a rotary machine part, a longitudinal member, means for securing said member to said rotary part, means for damping vibrations of said longitudinal member comprising a rod arranged within a hole provided within said longitudinal member and being of greater diameter than said rod, and means for pivotally securing said rod to the walls forming the hole in said longitudinal member which comprises a key extending through a slotted part of said rod engaging recesses provided within said hole, and a hemispherical seating member provided between said key and said rod.

In witness whereof I have hereunto set my hand this 21st day of August, 1930.

ALAN L. PAGET.